United States Patent [19]

Brown

[11] Patent Number: 4,799,748
[45] Date of Patent: Jan. 24, 1989

[54] SLAB-DIFFUSER FIBER INCIDENT ENERGY CONCENTRATOR

[76] Inventor: David C. Brown, 4751 State Rte. 34, Winfield, W. Va. 25213

[21] Appl. No.: 849,055

[22] Filed: Apr. 7, 1986

Related U.S. Application Data

[63] Continuation-in-part of Ser. No. 826,304, Feb. 5, 1986, Pat. No. 4,733,929.

[51] Int. Cl.⁴ .................................................. F24J 2/48
[52] U.S. Cl. .................................. 350/96.10; 126/441; 136/247; 350/96.29; 350/96.34
[58] Field of Search ............... 350/96.10, 96.24, 96.29, 350/96.34, 258, 259, 262, 265; 126/441, 442, 443; 136/247

[56] References Cited

U.S. PATENT DOCUMENTS

| 4,112,170 | 9/1978 | Rauscher | 350/96.34 X |
| 4,227,939 | 10/1980 | Zewail et al. | 350/96.10 X |
| 4,292,959 | 10/1981 | Coburn, Jr. | 350/265 X |
| 4,425,907 | 1/1984 | Younghouse | 350/96.1 X |
| 4,466,697 | 8/1984 | Daniel | 350/96.1 X |

FOREIGN PATENT DOCUMENTS 1235021 2/1967 Fed. Rep. of Germany ... 350/96.10

*Primary Examiner*—John D. Lee
*Attorney, Agent, or Firm*—Jim Zegeer

[57] ABSTRACT

A light piping device to concentrate solar energy and luminescence from photophosphorescence by using internal scattering within optical fiber wave guides and plate wave guide - reflective surfaces to enhance the fraction of light trapped within the optical fiber wave guides for increased light output at the device's edges.

8 Claims, 3 Drawing Sheets

SLAB-DIFFUSER FIBER INCIDENT ENERGY CONCENTRATOR

REFERENCE TO RELATED APPLICATION

This application is a continuation-in-part of my application Ser. No. 826,304 filed Feb. 5, 1986 (now U.S. Pat. No. 4,733,929) and entitled "Diffuser Fiber Incident Energy Concentrator".

BACKGROUND OF THE INVENTION

1. Field of the Invention

The present invention relates to the concentration of incident radiation, such as visable solar energy and photophosphrescence, by use of internal Rayleigh-MIE scattering and optical wave guide devices.

2. Prior Art

Certain radiation energy can be utilized more efficiently when concentrated, for example solar energy radiation for power production or luminescence from photophosphorescence in markers and signs. The phenomenon of total reflection at the interface between material of different refractive indexes has been employed to concentrate radiation energy. The same principle is the basis of light propagation in dielectric wave guides commonly referred to as optical fibers. However, with respect to using dielectric wave guides for concentration of incident radiation energy, an important consequence of Snell's law of reflection between material of different refractive indexes is that a source of radiation incident of the wave guide core cannot contribute to guide modes within the wave guide. The incident radiation will reflect and refract at the wave guide boundaries, but none of the wave's energy will be trapped as a guided wave.

One method to overcome this problem is used by Zewail U.S. Pat. No. 4,227,939. Fluorescent dye in the wave guide core absorbs the incident radiation and by fluorescence emission scatters the energy within the core to permit photon capture in guide modes. The method requires a variety of fluorescent material to cover the solar spectrum due to the specific absorption wave lengths associated with each fluorescent dye.

The complication of this approach arises from the need to maximize the absorption of incident photons without creating unacceptable transmission losses in the wave guide modes. The device is a slab type dielectric wave guide in which the trapped photons are reflected repeatedly across the plates central axis and through various fluorescent absorbers. A fraction of the photon energy is dissipated during each fluorescent cascade event which causes a lossy collector.

In U.S. patent application Ser. No. 06/826,304 (U.S. Pat. No. 4,733,929) a coaxial diffuser is created within the core region of a circularly cylindric fiber by forming microspheres of air or other material of suitable refractive indexes in the wave guide core. The interface between the microspheres and the core material reflect and refract the incident radiation as the rays pass into diffuser and creates the internal scatter required to allow the incident radiation to enter guide modes. The use of prismatic shapes to create a difusser is a satisfactory method, however, certain material and manufacturing procedures favor the use of colloidal inclusions of material with a refractive index different from the core material to create a light scattering diffuser region in the wave guide.

A coaxial diffuser incident energy concentrator is a low gain low loss collector which will benefit by recycling the untrapped scattered radiation for rescattering and trapping in wave guide modes.

SUMMARY OF THE INVENTION

Accordingly several objects of my invention will eliminate the disadvantages of the prior art.

To effect the required internal scattering of the incident radiation in the wave guide, an internal diffuser is used. A coaxial diffuser is created within the core region of a circularly cylindric fiber by adding colloidal, usually crystalline, inclusions with an index of refraction different from the core region material. Rayleigh-MIE scattering by the inclusions creates the desired internal diffusion of the incident energy. One common process is known as opalescent and in glass involves adding a phosphate or sodium fluoride to create an opal glass.

The coaxial diffuser is located along the axis of a circularly cylindric fiber of high index of refraction transparent material which forms the wave guide core. The core is encased in a transparent material with a lower index of refraction which forms the cladding to create a fiber wave guide. The cladding outer surface is shaped to form a slab type dielectric wave guide. The device is a slab type dielectric wave guide containing layers of fiber wave guides with coaxial diffusers that effect internal scattering and trapping of incident radiation in guide modes to effect propagation of the trapped energy to the wave guide ends and thereby concentrate the incident energy.

For a given energy flux ($\Phi$) striking an internal diffuser, Rayleigh-MIE scattering by the inclusions will create an approximately uniform radiation from the diffuser surface. At steady state conditions, the scattered incident energy flux radiating from the diffuser is equal to the incident energy flux striking the diffuser and can be viewed as a hemispherical surface radiating outward from the diffuser, with the vertical axis centered on the initial point of radiation and the horizontal axis tangent to the diffuser surface. In addition, a unit area of the hemispherical surface is representative of a unit of the scattered energy flux from that point on the diffuser surface. For example, half the hemispherical surface would be equivalent to half the energy flux scattered outward from that point on the diffuser surface. This classical light ray geometric analysis is satisfactory for electromagnetic radiation with the wave lengths of visible light and is the principal use in the following explanation of the device's performance in concentration incident energy.

As the scattered energy radiates outward from the diffuser surface, the rays first strike the interface between the wave guide and the cladding. FIG. 4 shows one of two opposite conical sections of rays (10) align to the wave guide axis with a vertex angle of $\theta = [(\pi/2) - \arcsin(Na/Nwg)]$ that strike the interface at an angle greater than the critical angle of incidence. These rays will be trapped in skew wave guide modes which are left and right handed helices that spiral along the fiber core in both directions. The skewness arises from the diffuser surface being located a finite distance from the wave guide axis and from the scattering by the diffuser of meridional rays as they attempt to recross the wave core axis. The tendency of the helix guide mode to progress along the wave guide core at a constant distance from the fiber's axis minimizes interference between the trapped rays and the incident radiation scatter process.

The percent of scattered energy (10) trapped in the fiber wave guide (t) is approximately equal to $100[1-\cos(90°-\arcsin(Mc/Mwg))]$. The range of (t) is from 6% to 25% of the scattered energy and is related to the energy wave length, the dispersion and the refractive index of the wave guide and cladding material, the diffuser characteristics, the diameter of the wave guide core and the ratio of diffuser diameter to the wave guide core diameter. This action of scattering and trapping the incident radiation is cumulative along the fiber wave guide axis, less attenuation losses, and creates the desired linear concentration of incident radiation at the wave guide ends.

The untrapped rays that cross the interface between the wave guide core and cladding are slightly refracted and radiate outward until they strike the air-cladding surface of the device, another wave guide core and or diffuser, or the bottom reflective surface of the device.

FIGS. 3 & 4 show the air-cladding interface of the devide (4) acts as a dielectric slab type wave guide and will reflect back into the device all the rays (3) that strike the air-cladding interface at an angle greater than the critical angle of incident. The unreflected rays (9) will exit from the devices surface and is scattered energy that is lost. The amount of lost energy can be visualized as a conical surface section of a hemispherical surface with an origin on that initial point of radiation from the diffuser's surface. FIG. 4 shows the energy loss surface and FIG. 3 shows the pathway of a ray striking the device air-cladding interface at the critical angle of incident. The energy loss at the device air-cladding interface (4) is (Lac) and the energy loss at the lower reflective surface (5), as shown in FIG. 2, is (f). The mathematical relations are:

$Lac = 0.5[\sin \phi_c + \cos \phi_c - 1]$ $f = 0.01$ to $0.05$ $w = 1 - [Lac + f]$ The amount of the initial untrapped scattered energy reflected back into the device (w) is related to the energy wave length, the dispersion and refractive index of the wave guide core, cladding and surrounding medium, the ratio of diffuser radius to the wave guide core radius, spacing between wave guide cores, the number of layers of wave guide cores, the bottom surface efficiency as a reflector and the position of the diffuser within the device where the scattered energy originated. (w) will range from approximately sixty to eighty percent.

The trapping efficiency of the device is enhanced by the return of the scattered energy for additional cycles of internal scattering by diffusers in various wave guide cores. Each scatter event will capture (t) amount of the returned energy in a wave guide core.

If (t) is the percent of energy trapped within the wave guide core from a scatter energy flux ($\Phi$) and (w) is the percent of the untrapped scattered energy reflected back into the device, then for a cycle of scatter, the amount of energy trapped is $\Phi t$ and the amount of scatter returned to the device is $[\Phi - \Phi t]w$. Therefore, the amount of energy trapped on the second cycle is $[\Phi - \Phi t]w \cdot t$ and the amount of energy returned for a third cycle is $[(\Phi - \Phi t)w - (\Phi - \Phi t)wt]w$ which reduces to $\Phi[(1-t)w]^2$. $\Phi$ is a constant, the initial scatter energy flux. Therefore, the amount of $\Phi$ reflected back into the wave guide cores and diffusers of the device is a geometric series with a general form $$\sum_{R=1}^{\infty} ar^{k-1} = \frac{a}{1-r},$$

if r is less than one.

The rate of energy trapped in skew wave guide modes in the wave guide core is also a constant, being a function of the energy wave length, the refractive index of core and cladding material, and the size and ratio of diffuser diameter to the core diameter. Therefore, the amount of the initial scattered energy flux trapped within the devices wave guide cores has the same solution of a geometric series:

$\Sigma \Phi \text{trapped} = t/[1-(1-t)w]$

The percent of the initial incident energy striking a diffuser that is trapped within the wave guide cores of the device will range from 30% to over 60%, less transmission loss. The low loss characteristics of the wave guide cores and the cumulative effect of trapping incident radiation along the wave guide core allows intense concentration of the incident light at the invention edges.

DESCRIPTION OF THE PREFERRED EMBODIMENT

Figure 2:
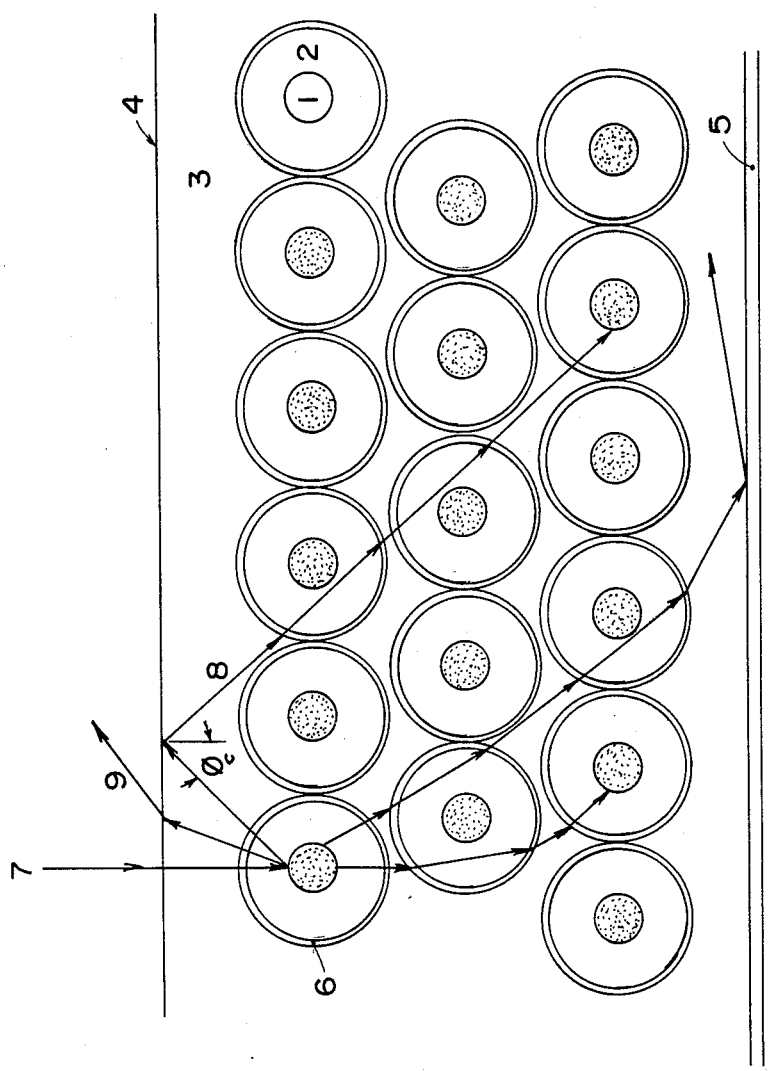
FIG. 2 is a cross section view of the invention with three layers of coaxial diffuser wave guide cores.

Referring to FIG. 2 the slab-diffuser fiber incident energy concentrator device cross sectional view is shown with the coaxial diffuser (1) in the wave guide core (2) embedded in cladding material (3). The upper surface of the device (4) is the air-cladding interface and the lower surface (5) is a reflective layer.

The coaxial diffuser (1) is an opalescent material such as soda glass, crown glass, flint glass, silica glass or quartz containing three to sixteen percent by weight sodium fluoride to create a translucent glass with colloidal, usually crystalline, inclusions that scatter the incident radiation energy (7). Certain phosphates, fluorides, sulfides, oxides, bromides, titanates, selenides, tellurides, arsenides, phosphides, arsenates, carbonates, iodides, and chlorides of sodium, cadmium, calcium, aluminum, barium, lead, arsenic, gallium, potassium, thallium, cesium, lithium, silicon, boron, magnesium, silver, bismuth, selenium indium, copper and titanium, air, water, argon, carbon dioxide, methane, silver, aluminum, gold, zircon, itrium, neodymium and chromium can also be used to create the microparticles, microspheres and colloidal inclusions with a refractive index different from the base glass to scatter the incident light and may be substituted for or combined with sodium fluoride. Special colorants, such as lead carbonate, lead arsenate, bismuth oxychloride, rutile and other commercially available material can be added separate or in combination with the above listed compounds to acrylic polymer methylmethacrylate, polystyrene, polycarbonate, methylmethacrylate styrene copolymer, allyldiglycol carbonate or polymethylpentane in various concentrations to create a material suitable for use as a coaxial diffuser.

The wave guide core (2) is a cylinder of optically clear material with respect to the incident radiation (7) wave length. The material may be a soda glass, crown glass, silica glass, dense barium flint glass, lanthanum flint glass, flint glass, arsenic trisulfide glass, acrylic polymer methylmethacrylate, polystyrene, polycarbonate, methylacrylate styrene copolymer, allyldiglysol carbonate, polymethylpentane or other suitable material that becomes commercially available and apparent to those skilled in the material art.

The wave guide core (2) and coaxial diffuser (1) shown in FIG. 2 is formed of a glass containing ten percent by weight sodium fluoride to create an "opal" glass for the diffuser (1) and a high refractive index Lanthanum flint glass for the wave guide core (2). The coaxial diffuser optical fiber wave guide can be drawn either using the rod-in-tube method or the double crucible method. These methods are well known to and commercially available from those skilled in the manufacturing of optical fiber wave guides.

Figure 4:
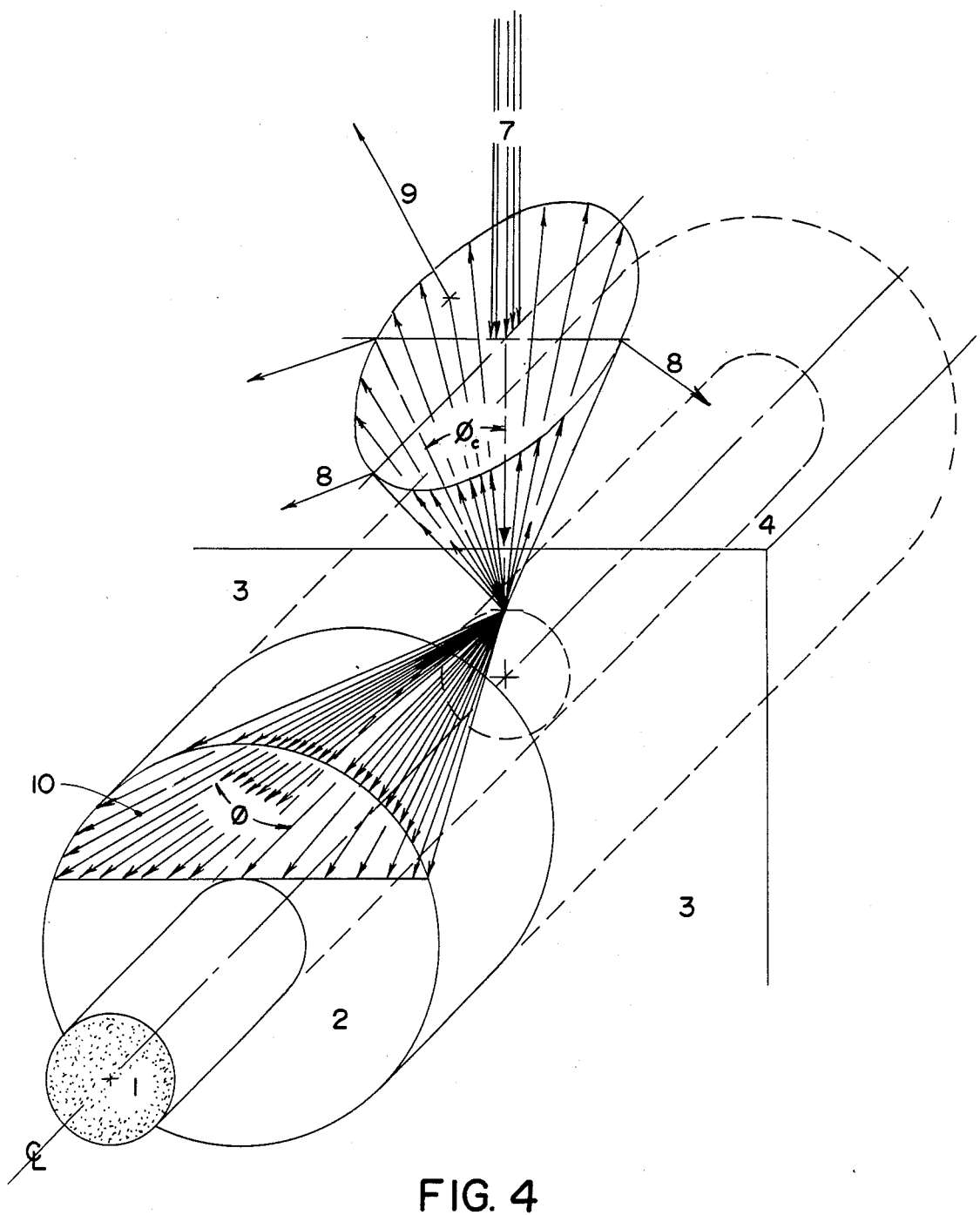
FIG. 4 is a perspective view of the conical surfaces of trapped and lost scattered incident radiation from a point on the diffuser's surface.

The wave guide core dimensions will vary depending on the material, manufacturing method and desired device configurations. For the wave guide core shown in FIG. 1, FIG. 2, and FIG. 4, the diffuser diameter is 40 $\mu$m and the core diameter is 120 $\mu$m. Therefore, eighty eight percent of the wave guide core's cross sectional area is available for wave propagation guide modes.

When the incident radiation (7) strikes and enters the diffuser, the colloidal inclusions of material with different refractive indexes from the diffuser's base material causes a random scattering of the light (8) or incident radiation. An individual ray or photon has equal probability of being scattererd in any direction. From a point on the diffuser surface, two opposite half cones of ray paths (10) are available to the scattered incident energy in which the scattered rays will strike the wave guide core and cladding interface at an angle of incident permitting total internal reflection and trapping of the ray. The probability function of a ray being trapped is:

$$t = 1 - \cos\left[\frac{1T}{2} - \arcsin\left(\frac{Nc}{Nwg}\right)\right]$$

Other variables being constant, the amount of scattered energy (10) entering pathways that will permit trapping in guide modes in the wave guide core (2) is inversely proportional to the ratio of the cladding (Nc) and wave guide core (Nwg) material index of refraction. For example, using an optical flint glass (Nwg=1.67) and acrylic polymer methyl methacrylate cladding (Nc=1.48) t=0.114 or approximately eleven percent of the incident radiation will enter trapping modes in the wave guide core.

With very high refractive index glass cores (Nwg=1.90) in a polyvinylidene fluoride cladding (Nc=1.42), t=0.253 or approximately twenty five percent of the scattered incident radiation will enter trapping modes in the wave guide core. Transmission losses are minimized by the short guide lengths, often under 500 mm.

Figure 1:
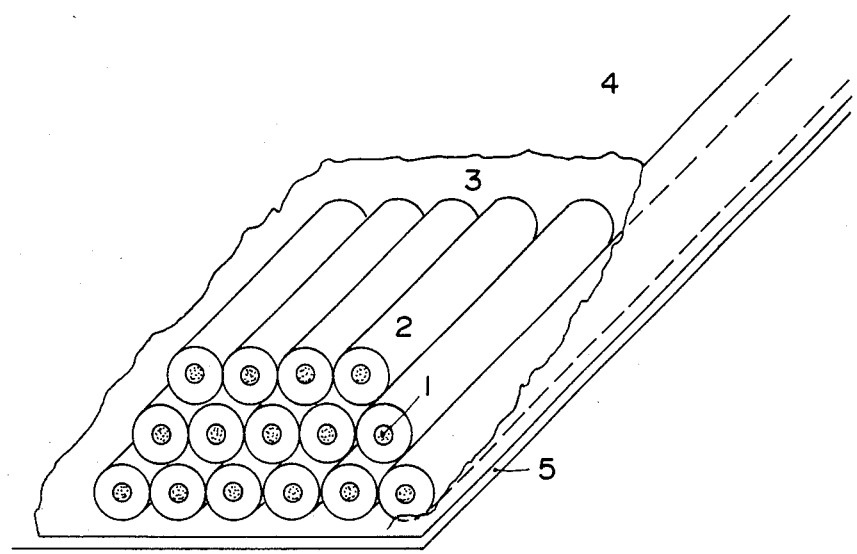
FIG. 1 is a partically sectional perspective view of the slab-diffuser fiber incident energy concentrator device.
Figure 3:
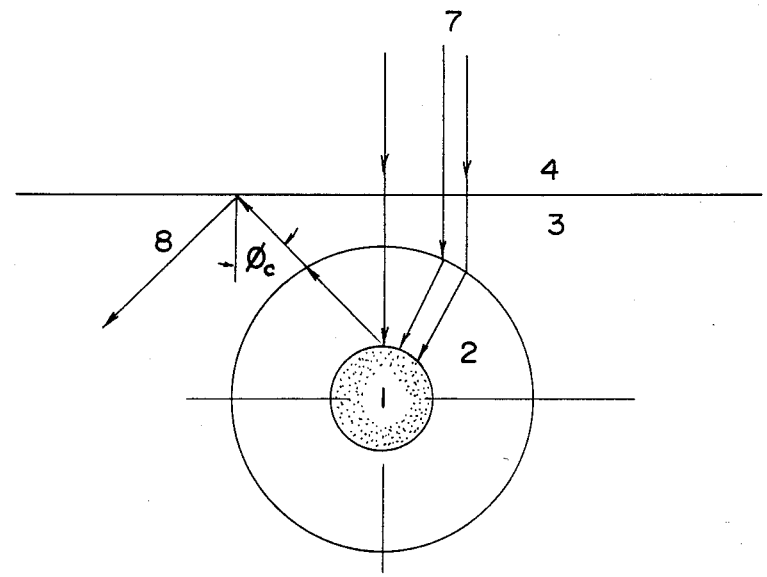
FIG. 3 is a cross section view of incident radiation, after scattering by a coaxial diffuser wave guide core, being internally reflected by the slab type wave guide created by the cladding-air interface.

Referring to FIG. 2, the wave guide cores are precoated with a thin layer of the cladding (6) material to assure a uniform interface between the wave guide core and cladding. This cladding also aids in maintaining a uniform spacing between the wave guide cores in the layering and embedment process. The device normally will have three, four, or five layers of wave guide cores, however, any number of layers can be used. FIG. 1 and FIG. 2 shows a three wave guide core layer device which presents a diffuser surface profile of 86% of the incident radiation target area. Four layers of wave guide cores will provide complete diffuser coverage to the incident radiation.

The cladding material (3) may be any material that is optically clear to the incident radiation, has a lower index of refraction than the wave guide core material, and is physically and chemically compatible with the core material. The cladding (3) shown in FIG. 2 is an acrylic polymer methyl methacrylate, but could be a soda glass, crown glass, flint glass, modified arsenic trisulfide glass, silica glass, polystyrene, polycarbonate, styrene acrylonitrile, methylmethacrylate styrene copolymer, allyldiglycol carbonate, polymethylpentane, fluorocarbon resin, FEP fluroplastic, polyvinylidene fluoride, or other commercially available material with suitable properties.

The reflective layer (5) shown in FIG. 1 and FIG. 2 is a mirror of chemically clean aluminum foil coated with a thin layer of acrylic polymer with suitable properties for bonding the aluminum foil and cladding. Any material physically and chemically compatible with the cladding material that can efficiently reflect the scattered energy (8) wave length may be used. For example, visible light will be reflected by gold, silver, stainless steel or chromium layer. Microspheres of glass with a very high refractive index can be used for the reflective layer (5). Applications involving an incident radiation energy with monochromatic characteristics, such as photophosphorescence backscatter emission, a Turner multiple layer reflective system using alternating high and low refractive index material in quarter wave films could be used as the reflective layer (5).

The primary influence on the amount of scattered energy reflected back (w) into the coaxial diffusers wave guide cores is the air-cladding interface (4) and the reflective layer (5). The reflective layer (5) is very effective in returning the scattered energy, however, the upper surface (4) is dependent on the critical angle of incident as related in Snell's Law and depends on the refractive index of the cladding and surrounding medium, generally air with (m=1.00). The refractive index of wave guide core material and the ratio and size of the coaxial diffuser diameter to the wave guide core also influences the amount of scattered energy return (w).

The amount of scattered energy returned (w) is a function of the critical angle of incident for the air-cladding surface (4) as given by Snell's relationship $\phi_c = \arcsin (M/Mc)$ and has the approximate form of:

$$w \approx 1.475 - 0.5(\sin \phi_c + \cos \phi_c)$$

This action of re-reflecting untrapped scattered energy (8) through the wave guide cores of the device enhances the probability of the rays entering guide modes within the wave guide cores. The sum of the trapping $\Sigma t$ resulting from this recycling of the initial scattered energy flux has the solution:

$$\Sigma t = t/[1-(1-t)w]$$

For example, a device with Nwg=1.67 wave guide cores and Nc=1.48 cladding has the probability of trapping t=0.114 or approximately eleven percent of the initial scattered energy from the diffuser. By recycling, the total probability of trapping increases to approximately thirty five percent. For a device with a very high Nwg=1.90 wave guide cores and Nc=1.42 cladding, t=0.253 or approximately twenty five percent of the initial diffuser scattered energy has the probability of being scattered at angles of incident to the wave guide core-cladding interface that will allow entry into guide modes in the wave guide core. Recycling raises this trapping probability to approximately fifty nine percent.

The slab-diffuser fiber incident energy concentrator device is assembled by sheet coating, fiber layering, embedment and surface finishing methods well known to and commercially available from those skilled in the manufacturing of composite sheet material.

The preferred embodiment of the invention described is for incident radiation energy associated with photophosphorescence and luminous efficiency in the 450 $\mu$m to 650 $\mu$m wave length range used in markers and signs. By varying the coaxial diffuser, wave guide core, cladding and reflective layer material incident radiation energy in the near ultraviolet and infrared wave lengths can be preferentially concentrated for energy production. For incident energy in the ultraviolet range, silica glasses are commercially available that are suitable for use as wave guide cores when used in combination with a low refractive index fluorocarbon resin for the cladding. For infrared incident energy, arsenic trisulfide glass is commercially available that is suitable for infrared wave guide cores when cladded with a modified arsenic trisulfide glass.

By adding layers of ultraviolet and infrared coaxial diffuser wave guide cores with the appropriate individual cladding, along with the visable light coaxial diffuser-wave guide cores in a cladding transparent to these wave lengths, a broad spectrum solar energy concentration can be effected by the invention. Also due to the preferential selection of incident radiation energy wave lengths available by the choice of the material selected for the coaxial diffuser wave guide core and cladding, only the energy wave lengths most useful to a specific solar cell in power generation can be concentrated by the invention.

In one embodiment the coaxial diffuser means is a coaxial region of the circularly cylindric optical wave guide core (i) aligned along the center line of the wave guide core and containing 0.01 to 25.00 percent by weight microspheres, microparticles, and/or colloidal inclusions of material with an index of refraction different from the base material of diffuser region that reflect and or refract the incident radiation energy to effect a uniform internal scatter of the incident radiation energy within the wave guide core.

In another embodiment, the diffuser means is coaxial region of the wave guide core aligned along the center line of the wave guide core (i) and containing 0.0001 to 2.0 percent by weight luminescent absorbers and organic fluorescent dyes that reemit the absorbed incident radiation by fluorescence to create a uniform internal scatter of the incident radiation energy within the wave guide core.

It is to be realized that only preferred embodiments of the invention have been described and that numerous alternations, modifications, and substitutions are all permissible without department from the spirit and scope of the invention as defined in the following claims.

What is claimed is:

1. A radiant energy concentrator for radiation energy having a predetermined wave length, a dielectric slab wave guide means having an upper surface exposed to radiant energy to be concentrated, a bottom surface, means causing said bottom surface to be reflective, an edge for emitting concentrated radiant energy to a utilization device, said slab wave guide means comprising cylindric optical wave guide elements, each said wave guide element having coaxial diffuser means for internally scattering the incident radiation and causing a fraction of the scattered incident radiation to enter guide modes and become trapped within the cylindric optical wave guide while the untrapped portion of the initial scattered radiation is internally reflected by dielectric slab wave guide means and said bottom reflective surface, through other of said cylindric optical wave guide elements with coaxial diffuser means, thereby trapping an additional fraction of the initial untrapped portion of scattered radiation within cylindric optical wave guide element and by cumulative propagation of trapped incident radiation energy along the cylindric optical wave guide element lengths effect a concentration of incident radiation energy at said edge for emission to a utilization device.

2. A device according to claim 1 in which the cylindric optical wave guide coaxial diffuser means includes internal diffuser means to scatter incident radiation energy within a circularly cylindric optical wave guide to effect capture of a fraction of the internally scattered radiation energy in guide modes of the wave guide and by cumulative propagation of trapped incident radiation energy along the wave guide length effect a concentration of incident radiation energy at the devices edge.

3. A device according to claim 2 in which the coaxial diffuser means is a coaxial region of the circularly cylindric optical wave guide core aligned along the center line of the wave guide core and containing 0.01 to 25.00 percent by weight microspheres, microparticles, and or colloidal inclusions of material with an index of refraction different from the base material of diffuser region that reflect and or refract the incident radiation energy to effect a uniform internal scatter of the incident radiation energy within the wave guide core.

4. A device according to claim 3 in which the microspheres, microparticles, and colloidal inclusions that effect the scatter of the incident radiation energy are comprised of one or a combination of the following compounds and elements:

phosphates, fluorides, sulfides, oxides, bromides, titanates, selenides, tellurides, arsenides, phosphides, arsenates, carbonates, iodides, and chlorides of sodium, cadmium, calcium aluminum, barium, lead, arsenic, gallium, potassium, thallium, cesium, lithium, silicon, boron, magnesium, silver, bismuth, selenium, indium, copper and titanium, air, water, argon, carbon dioxide, methane, silver, aluminum, gold, zircon, chromium, neodymium and yttrium.

5. A device according to claim 2 in which the diffuser means is coaxial region of the wave guide core aligned along the center line of the wave guide core and containing 0.0001 to 2.0 percent by weight luminescent absorbers and organic fluorescent dyes that reemit the absorbed incident radiation by fluorescence to create a uniform internal scatter of the incident radiation energy within the wave guide core.

6. A device according to claim 2 in which the circularly cylindric optical wave guide is a material transparent to the incident radiation wave lengths and comprised of a material selected from composed of one or more of a soda glass, dense barium flint glass, lanthanum flint glass, crown glass, silica glass, flint glass, arsenic trisulfide glass, acrylic polymer methylmethacrylate, polystyrene, polycarbonate, methylacrylate styrene copolymer, allyldiglysol carbonate or polymethyl pentane.

7. A device according to claim 1 in which the dielectric slab wave guide means is a material transparent to the incident radiation wave lengths and composed of a material selected from one or more of a soda glass, crown glass, flint glass, modified arsenic trisulfide glass, silica glass, acrylic polymer methylmethacrylate, polystyrene, polycarbonate, styrene acrylonitrile, methylmethacrylate styrene copolymer, allyldiglycol carbonate, polymethylpentane, fluorocarbon resin, FEP fluoroplastic or polyvinylidene fluoride which forms the cladding for the embedded cylindric optical wave guides and by finishing in the form of a thin plate create a dielectric slab wave guide.

8. A device according to claim 1 in which the bottom reflective surface is a material that will reflect and or refract the scattered incident radiation wave lengths and is selected from one or a combination of aluminum foil, aluminum, silver, gold, stainless steel, chromium, $Mg F_2$, $Na_3 F_6$, $Li F$, $SiO$, $Si O_2$, $Al_2 O_3$, $Zn S$, $Ti O_2$, $Sb_2 S_3$ or high refractive index glass microbeads.

* * * * *